Feb. 9, 1960   R. O. BLASCHKE   2,924,486
TRACTION INCREASING AND SAFETY DEVICE
Filed Aug. 13, 1956   3 Sheets-Sheet 1

INVENTOR
Rudolph O. Blaschke

BY
Patrick D. Beavers
ATTORNEY

Feb. 9, 1960 R. O. BLASCHKE 2,924,486
TRACTION INCREASING AND SAFETY DEVICE
Filed Aug. 13, 1956 3 Sheets-Sheet 2
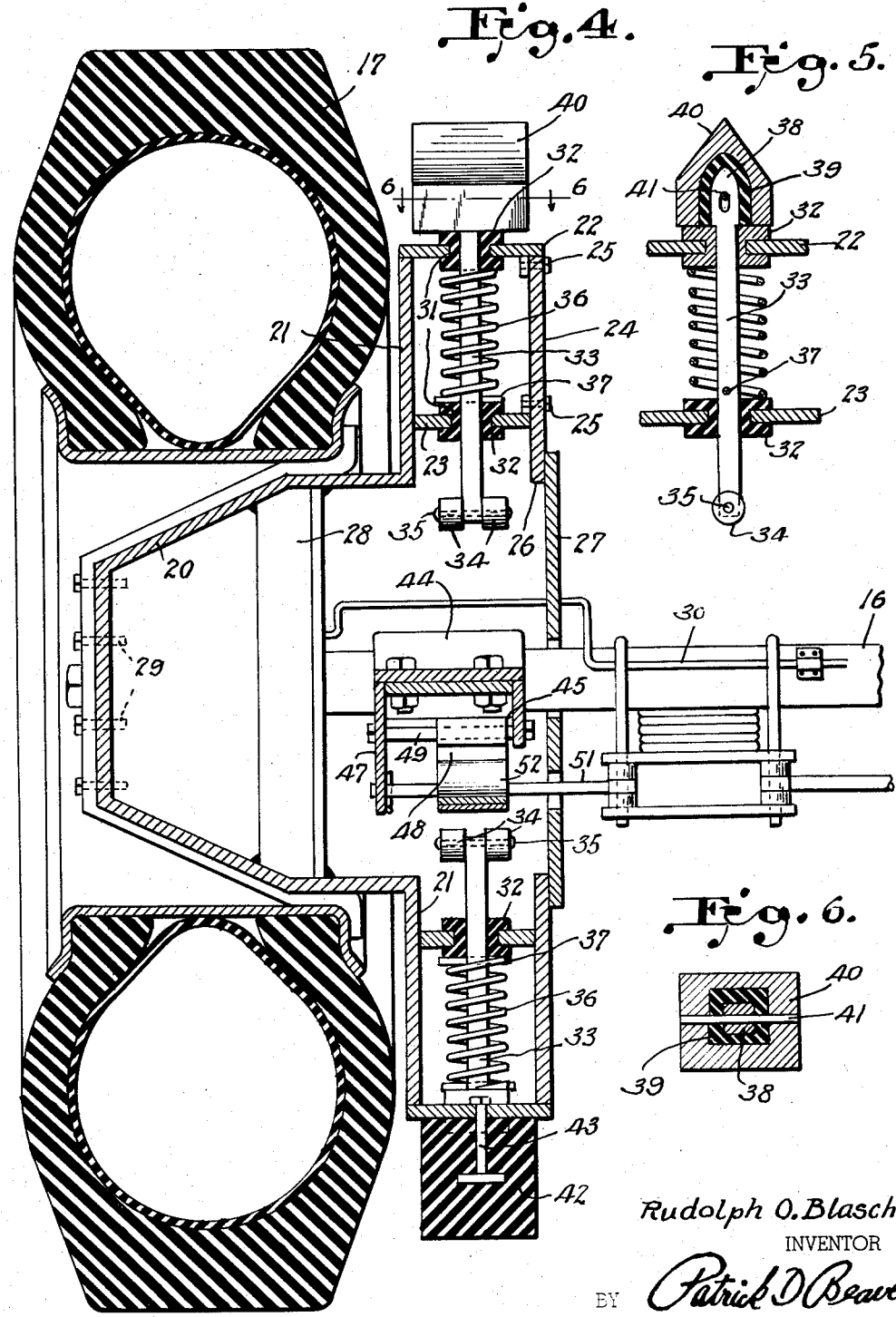
Rudolph O. Blaschke
INVENTOR
BY Patrick D. Beavers
ATTORNEY Feb. 9, 1960   R. O. BLASCHKE   2,924,486
TRACTION INCREASING AND SAFETY DEVICE
Filed Aug. 13, 1956   3 Sheets-Sheet 3
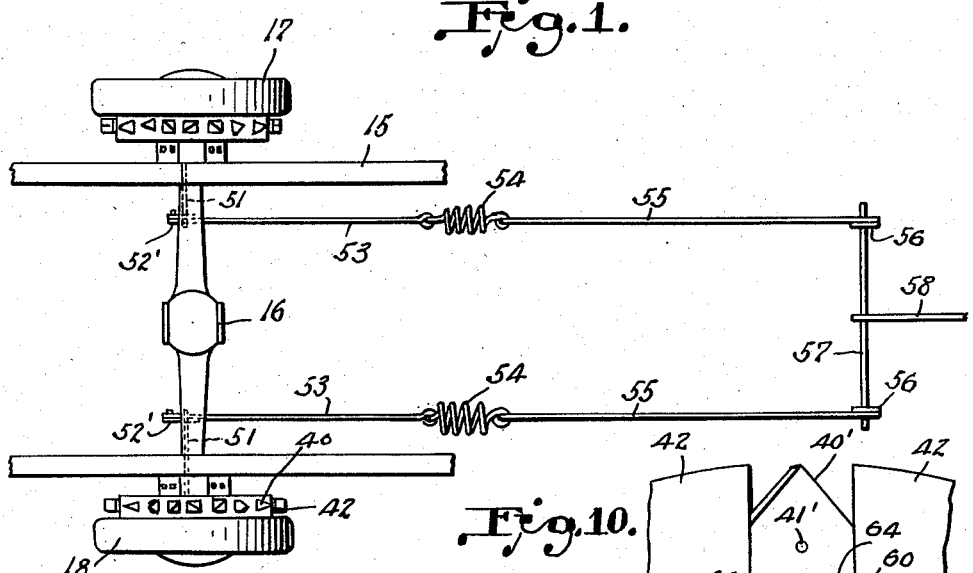
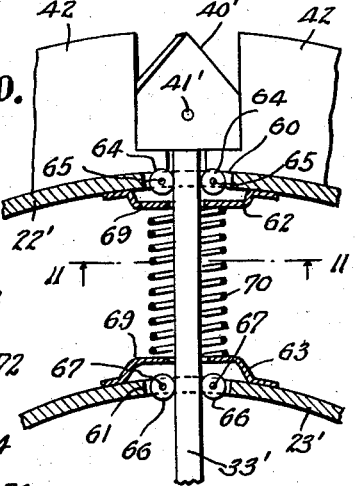
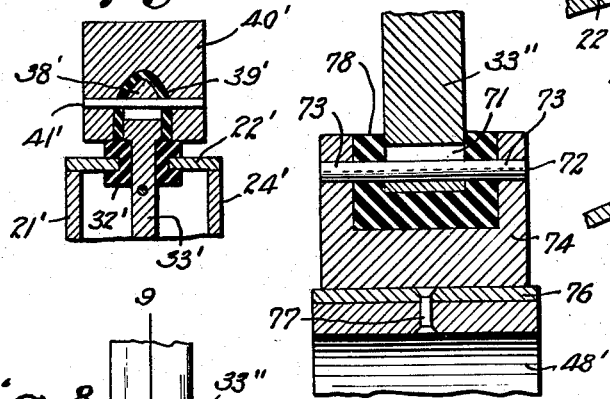
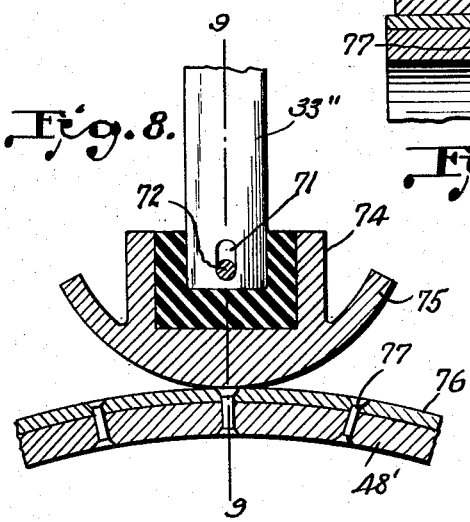
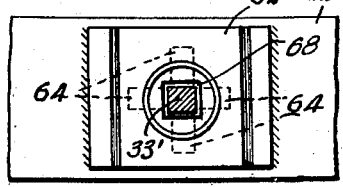
Rudolph O. Blaschke
INVENTOR
BY Patrick D. Beavers
ATTORNEY

United States Patent Office 2,924,486
Patented Feb. 9, 1960

2,924,486
TRACTION INCREASING AND SAFETY DEVICE

Rudolph O. Blaschke, New Berlin, N.Y.

Application August 13, 1956, Serial No. 603,745

5 Claims. (Cl. 301—48)

This invention relates to improvements in traction increasing and safety devices and the primary object of this invention is to provide a device of this character that is adapted to be used on automobiles.

Another object of the invention is to provide a device of this character that may be slightly altered to be used on trucks, tractors, and agricultural machines.

The device is adapted to give an automobile more traction while the automobile is being driven on ice, snow or on muddy roads.

A further object of the invention is to provide a device that will eliminate the use of tire or skid chains.

With the above and other objects and advantages in view the invention consists of the novel details of construction, arrangement and combination of parts more fully hereinafter described, claimed and illustrated in the accompanying drawings in which:

Fig. 1 is a plan view, partly broken away, of an automobile chassis having a traction increasing device embodying the invention attached thereto;

Fig. 4 is a vertical sectional view of the operating mechanism for the device on the line 4—4 of Fig. 2;

Fig. 5 is a detailed fragmentary sectional view of one of the ground engaging elements;

Fig. 6 is a transverse sectional view on the line 6—6 of Fig. 4;

Fig. 7 is a view similar to Fig. 5 with the element turned 45 degrees from the position of Fig. 5;

Fig. 8 is a detailed fragmentary sectional view of a modified form of a cam engaging runner;

Fig. 9 is a vertical sectional view on the line 9—9 of Fig. 8;

Fig. 10 is a detailed fragmentary sectional view of a further modification of the invention showing guide rollers for the ground engaging elements; and Fig. 11 is a sectional view on the line 11—11 of Fig. 10.

Figure 2:
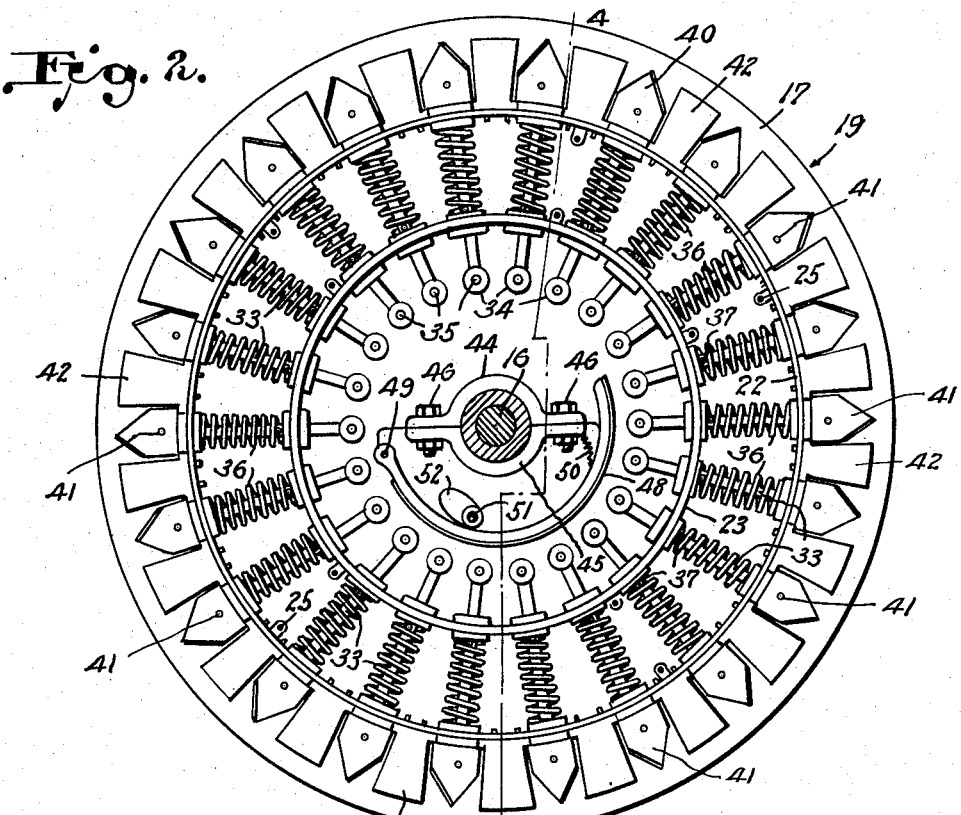
Fig. 2 is a plan view, partly in section, of the device embodying the invention in inoperative position.

Referring more in detail to the drawings, wherein like parts are designated by like reference numerals, the reference numeral 15 is used to generally designate the chassis of an automobile.

In the conventional manner the chassis has a rear axle housing 16 connected thereto and a pair of drive wheels 17 and 18 are mounted for rotation at the outer ends of the housing 16.

Figure 3:
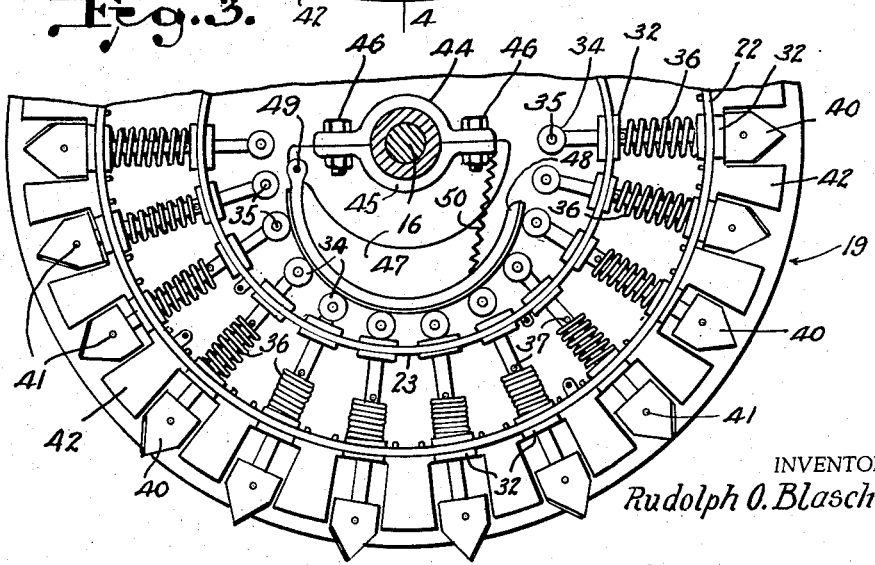
Fig. 3 is a view similar to Fig. 2 with a portion of the traction increasing elements in ground engaging position.

A traction increasing device 19 is clearly shown in Figs. 2 and 3 and the device 19 is associated with the wheels 17 and 18 in the same manner as a pair of dual wheels or the device 19 can be welded to the wheels 17 and 18, respectively, as shown in Figs. 1, 2 and 3.

The traction increasing device 19 comprises a substantially conical shaped hub 20 that is provided with a circular annular flange 21 at right angles to the axis of the hub 20.

A circular ring 22 is fixed to the peripheral edge of the flange 21 at right angles thereto. A second circular ring 23 is connected along one peripheral edge thereof to the flange 21.

The ring 23 is spaced from and is parallel to the ring 22 and a circular plate 24 is connected by bolts 25 to the rings 22 and 23, respectively. The plate 24 has a central opening 26 therein that is covered by a stationary closure plate 27. The hub 20 of the traction increasing device 19 is mounted on the brake drum cover 28 and the wheel 17 is mounted on the hub 20 by lug bolts 29, or it can be welded in place as desired.

The axle housing 16 supports the wheel 17 in the usual manner and the brake fluid line 30 extends through the brake drum cover 28 to operate the brake shoes in the conventional manner.

The rings 22 and 23 have a plurality of relatively spaced alined square shaped openings 31 therein and each opening receives a rubber block 32, having a bore therein, in which is mounted a square shaped rod 33. Each of the rods 33 has a pair of rollers 34 mounted on a shaft 35 which extends through the inner end of each of the rods 33 at right angles thereto. A coil spring 36 is mounted on each of the rods 33 in circumjacent relation thereto and a pin 37, extending through each of the rods 33 at right angles thereto, engages one end of the spring 36 to urge the outer end of the rod 33 inwardly of the rings 22 and 23.

Each rod 33 has a head 38 on which is mounted a rubber cap 39. A replaceable steel cap 40 is mounted on the cap 39 and retained thereon by means of a pin 41 extending through alined openings in the head 38 and caps 39 and 40, respectively. The steel caps 40 may be canted to the right or left to give a better traction grip. The heads 38 on rods 33 are canted left and right.

A plurality of solid rubber blocks 42 are connected to ring 22 by bolts 43 and the blocks are spaced intermediate of the ground engaging caps 40 on the rods 33.

The blocks 42 provide a ground engaging tread which will engage the ground if at any time the tires on the wheels 17 or 18 should become flat.

Mounted on the housing 16 are a pair of brackets 44 and 45 and these brackets are retained on the housing 16 by bolts 46.

The bracket 45 has an arcuate portion 47 integral therewith and an arcuate shaped shoe 48 is pivoted at one end at 49 to the portion 47. A spring 50 connected to the plate 47 and shoe 48 urges the shoe 48 into engagement with the edge of the portion 47.

A shaft 51 is mounted in each of the portions 47 of the brackets 45 and a cam 52 is mounted on the outer end of each of the shafts 51. The shafts 51 extend toward each other in parallel relation to the housing 16 and are pivotally connected by a link 52' to a rod 53. There are two of the rods 53 and each rod is connected to a shock absorbing spring 54. A second pair of rods 55 are connected to the springs 54 and the opposite ends of the rods 55 are pivotally connected by links 56 to a cross rod 57. A control rod 58 is connected to the cross rod 57 and extends to a position convenient to the operator of the automobile on which the device is mounted.

In operation, the control rod 58 is actuated to move cams 52 into position to force the shoes 48 into contact with the rollers 34. This action will cause the elements 40 to be engaged with the ground to give traction to the wheel. The automobile is not to be supported by the elements 40 since the elements 40 only give traction to the automobile as found necessary.

In this form of the invention the rollers 34 may be made of rubber or steel. If made of rubber, the shoes 48 will need no lining. However, if the rollers are made of metal, a rubber lining will be secured to the shoes 48.

The use of the various materials reduces friction and eliminates noise.

In Figs. 10 and 11, a different form of ground engaging element is shown.

The rod 33' extends through the alined square shaped opening 60 in the ring 22' and the alined square shaped opening 61 in the ring 23'. A pair of spring supporting plates 62 and 63 are secured to the rings 22' and 23' at radial points with relation to the rods 33', rollers 64 are journalled on shafts 65 within the opening 60 and rollers 66 are journalled on shafts 67 within the opening 61. There is a roller engaging each side of the rods 33' and since the rods 33' are of square formation the rods 33' are maintained in proper alinement at all times by the rollers 64 and 66, respectively. The rods 33' extend through square shaped openings 68 in the plates 62 and 63, respectively. The plates 62 and 63 are welded to their respective rings, as shown in Fig. 11. The plates 62 and 63 have a depression 69 therein to accommodate the rollers 64 and 66 and a coil spring 70 is positioned on each of the rods 33' in circumjacent relation thereto and in engagement at its opposite ends with the plates 62 and 63, as shown in Figs. 10 and 11.

In Figs. 8 and 9 there is shown a modified form of a cam engaging runner, and in this form of the invention the inner end of each of the rods 33" has a slot 71 therein to receive a pin 72 which extends through the alined openings 73 in a cup shaped member 74. The member 74 has an arcuate shaped shoe portion 75 thereon that is adapted to engage the brake shoe lining 76 that is secured to a shoe 48' by rivets 77. A rubber cushioning cup 78 is positioned in the member 74 in engagement with the end of the rod 33".

This form of the invention operates in the same manner as the form previously described and differs only in the use of the shoe portion 75 in lieu of the rollers 34.

It is believed that from the foregoing description the operation and construction of the invention will be apparent to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A traction increasing device for use with an inflatable-tired traction wheel that is rotatably mounted by the rear axle housing of an automobile comprising a hub, means for attaching said hub to said wheel, an annular flange for said hub, a circular plate mounted in spaced parallel relation to said flange, a ring interconnecting the peripheral edges of said flange and said plate, a second ring interconnecting said flange and plate inwardly and in concentrically spaced relation to said first-mentioned ring, a plurality of spring retractable ground-engaging elements extending radially and slidably through said rings, means for moving said ground-engaging elements outwardly of said rings into contact with the ground, said means comprising a pair of brackets mounted on the rear axle housing, a spring biased arcuate shaped shoe pivotally mounted on one of said brackets, and cam means for moving said shoe into engagement with said elements to move said elements outwardly of said rings, said elements being in circumferentially spaced relation to each other, and a plurality of solid rubber blocks each affixed to the outer side of said first-mentioned ring between an adjacent pair of said ground-engaging elements, said blocks having their outer extremities extending to points whereby they will engage the ground in the event of deflation of the automobile tire.

2. A traction increasing device as in claim 1, wherein said elements are provided with a stem that is slidably mounted in said rings and cam engaging means are mounted on each of said stems.

3. A traction increasing device as in claim 2, wherein guide means for said stems are mounted in each of said rings.

4. A traction increasing device as in claim 3, wherein said guide means comprise a pair of opposed rollers that are rotatably mounted in each of said rings.

5. A traction increasing device as in claim 3, wherein said guide means comprise rubber blocks that are mounted in each of said rings.

References Cited in the file of this patent

UNITED STATES PATENTS

| 1,321,992 | Disselkoen | Nov. 18, 1919 |
| 1,427,813 | Holt | Sept. 5, 1922 |
| 1,576,570 | Busch | Mar. 16, 1926 |
| 1,578,478 | Spescha | Mar. 30, 1926 |
| 1,883,836 | Wallace | Oct. 18, 1932 |
| 2,171,844 | Chaffin | Sept. 5, 1939 |

FOREIGN PATENTS

| 320,706 | Germany | Apr. 29, 1920 |
| 673,816 | Germany | May 20, 1939 |
| 866,615 | Germany | Feb. 12, 1953 |
| 288,618 | Switzerland | May 16, 1953 |